US008172417B2

(12) United States Patent
Baar

(10) Patent No.: US 8,172,417 B2
(45) Date of Patent: May 8, 2012

(54) SHAPED FRONTLIGHT REFLECTOR FOR USE WITH DISPLAY

(75) Inventor: Kenneth W. Baar, Escondido, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 419 days.

(21) Appl. No.: 12/399,798

(22) Filed: Mar. 6, 2009

(65) Prior Publication Data

US 2010/0226118 A1 Sep. 9, 2010

(51) Int. Cl.
*G09F 13/00* (2006.01)

(52) U.S. Cl. .......... 362/97.1; 362/609; 362/346; 349/62

(58) Field of Classification Search .......... 362/612–613, 362/615, 621–622, 97.1–97.3, 608–609, 362/346, 632–634; 349/62, 65, 69, 63
See application file for complete search history.

(56) References Cited

U.S. PATENT DOCUMENTS

| 3,439,973 | A | 4/1969 | Paul et al. |
| 3,886,310 | A | 5/1975 | Guldberg |
| 3,924,929 | A | 12/1975 | Holmen |
| 4,228,437 | A | 10/1980 | Shelton |
| 4,378,567 | A | 3/1983 | Mir |
| 4,421,381 | A | 12/1983 | Ueda et al. |
| 4,441,791 | A | 4/1984 | Hornbeck |
| 4,918,577 | A | 4/1990 | Furudate |
| 5,050,946 | A | 9/1991 | Hathaway |
| 5,142,414 | A | 8/1992 | Koehler |
| 5,151,801 | A | 9/1992 | Hiroshima |
| 5,226,099 | A | 7/1993 | Mignardi et al. |
| 5,291,314 | A | 3/1994 | Agranat |
| 5,339,179 | A | 8/1994 | Rudisill |
| 5,452,385 | A | 9/1995 | Izumi |
| 5,481,385 | A | 1/1996 | Zimmerman et al. |
| 5,497,293 | A * | 3/1996 | Noguchi et al. .............. 362/609 |
| 5,515,184 | A | 5/1996 | Caulfield |
| 5,550,373 | A | 8/1996 | Cole |
| 5,555,160 | A | 9/1996 | Tawara |
| 5,579,149 | A | 11/1996 | Moret |
| 5,615,024 | A | 3/1997 | May et al. |

(Continued)

FOREIGN PATENT DOCUMENTS

CN 1381752 11/2002

(Continued)

OTHER PUBLICATIONS

Fan et al. "Channel Drop Filters in Photonic Crystals", Optics Express, vol. 3, No. 1, pp. 4-11, 1998.

(Continued)

*Primary Examiner* — Robert May

(74) *Attorney, Agent, or Firm* — Knobbe Martens Olson & Bear LLP

(57) ABSTRACT

In order to minimize the footprint of a display module, a frontlight system positioned over a first surface of a substrate may be used. The frontlight system may include an edgebar positioned over the first surface of a display substrate, and a Z-shaped reflector having a first planar portion overlying the edgebar and a second planar portion adhered to the first surface of the substrate or layers overlying the first surface of the substrate. Such a reflector may be located wholly within the footprint of the display substrate, minimizing the footprint of the display module.

24 Claims, 15 Drawing Sheets

U.S. PATENT DOCUMENTS

| | | |
|---|---|---|
| 5,647,036 A | 7/1997 | Deacon |
| 5,664,862 A | 9/1997 | Redmond et al. |
| 5,671,994 A | 9/1997 | Tai |
| 5,673,128 A | 9/1997 | Ohta et al. |
| 5,712,694 A | 1/1998 | Taira et al. |
| 5,731,857 A | 3/1998 | Neijzen |
| 5,771,321 A | 6/1998 | Stern |
| 5,808,708 A | 9/1998 | Oyama et al. |
| 5,845,035 A | 12/1998 | Wimberger-Friedl |
| 5,883,684 A | 3/1999 | Millikan et al. |
| 5,892,598 A | 4/1999 | Asakawa et al. |
| 5,913,594 A | 6/1999 | Iimura |
| 5,920,417 A | 7/1999 | Johnson |
| 6,040,937 A | 3/2000 | Miles |
| 6,055,090 A | 4/2000 | Miles |
| 6,074,069 A | 6/2000 | Chao-Ching |
| 6,099,134 A | 8/2000 | Taniguchi |
| 6,151,089 A | 11/2000 | Yang et al. |
| 6,195,196 B1 | 2/2001 | Kimura |
| 6,199,989 B1 | 3/2001 | Maeda et al. |
| 6,259,082 B1 | 7/2001 | Fujimoto et al. |
| 6,273,577 B1 | 8/2001 | Goto |
| 6,283,602 B1 | 9/2001 | Kawaguchi et al. |
| 6,292,504 B1 | 9/2001 | Halmos |
| 6,359,668 B1 | 3/2002 | Iijima et al. |
| 6,377,233 B2 | 4/2002 | Colgan |
| 6,412,969 B1 | 7/2002 | Torihara |
| 6,431,716 B1 | 8/2002 | Kusakabe |
| 6,454,452 B1 | 9/2002 | Sasagawa |
| 6,494,588 B1 | 12/2002 | Okada |
| 6,519,073 B1 | 2/2003 | Goossen |
| 6,522,794 B1 | 2/2003 | Bischel |
| 6,540,368 B2 | 4/2003 | Akaoka |
| 6,561,661 B2 | 5/2003 | Egawa |
| 6,565,225 B2 | 5/2003 | Mabuchi et al. |
| 6,582,095 B1 | 6/2003 | Toyoda |
| 6,592,234 B2 | 7/2003 | Epstein |
| 6,597,490 B2 | 7/2003 | Tayebati |
| 6,598,987 B1 | 7/2003 | Parikka |
| 6,603,520 B2 | 8/2003 | Umemoto |
| 6,631,998 B2 | 10/2003 | Egawa et al. |
| 6,636,358 B2 | 10/2003 | Umemoto et al. |
| 6,642,913 B1 | 11/2003 | Kimura |
| 6,650,455 B2 | 11/2003 | Miles |
| 6,652,109 B2 | 11/2003 | Nakamura |
| 6,657,700 B2 | 12/2003 | Sako et al. |
| 6,659,615 B2 | 12/2003 | Umemoto |
| 6,674,562 B1 | 1/2004 | Miles |
| 6,680,792 B2 | 1/2004 | Miles |
| 6,683,693 B1 | 1/2004 | O'Tsuka |
| 6,741,377 B2 | 5/2004 | Miles |
| 6,742,907 B2 | 6/2004 | Funamoto et al. |
| 6,751,023 B2 | 6/2004 | Ariyoshi et al. |
| 6,761,461 B2 | 7/2004 | Mizutani et al. |
| 6,773,126 B1 | 8/2004 | Hatjasalo |
| 6,792,293 B1 | 9/2004 | Awan et al. |
| 6,794,119 B2 | 9/2004 | Miles |
| 6,798,469 B2 | 9/2004 | Kimura |
| 6,819,380 B2 | 11/2004 | Wen et al. |
| 6,829,258 B1 | 12/2004 | Carlisle |
| 6,853,418 B2 | 2/2005 | Suzuki et al. |
| 6,862,141 B2 | 3/2005 | Olczak |
| 6,863,428 B2 | 3/2005 | Lundin |
| 6,864,882 B2 | 3/2005 | Newton |
| 6,871,982 B2 | 3/2005 | Holman et al. |
| 6,879,354 B1 | 4/2005 | Sawayama |
| 6,880,959 B2 | 4/2005 | Houston |
| 6,882,461 B1 | 4/2005 | Tsai |
| 6,883,924 B2 | 4/2005 | Maeda et al. |
| 6,897,855 B1 | 5/2005 | Matthies |
| 6,930,816 B2 | 8/2005 | Mochizuki |
| 6,951,401 B2 | 10/2005 | Van Hees et al. |
| 6,960,010 B2 | 11/2005 | Matsumoto et al. |
| 6,964,484 B2 | 11/2005 | Gupta |
| 6,972,827 B2 | 12/2005 | Mi |
| 7,014,349 B2 * | 3/2006 | Shinohara et al. ............ 362/600 |
| 7,042,444 B2 | 5/2006 | Cok |
| 7,042,643 B2 | 5/2006 | Miles |
| 7,048,426 B2 * | 5/2006 | Kao et al. ...................... 362/616 |
| 7,050,219 B2 | 5/2006 | Kimura |
| 7,056,001 B2 | 6/2006 | Chuang |
| 7,072,093 B2 | 7/2006 | Piehl |
| 7,072,096 B2 | 7/2006 | Holman et al. |
| 7,123,216 B1 | 10/2006 | Miles |
| 7,128,459 B2 | 10/2006 | Igarashi et al. |
| 7,133,022 B2 | 11/2006 | Grabert |
| 7,142,347 B2 | 11/2006 | Islam |
| 7,187,489 B2 | 3/2007 | Miles |
| 7,236,663 B2 | 6/2007 | Wakita et al. |
| 7,256,922 B2 | 8/2007 | Chui et al. |
| 7,342,705 B2 | 3/2008 | Chui et al. |
| 7,349,139 B2 | 3/2008 | Chui |
| 7,349,141 B2 | 3/2008 | Tung |
| 7,352,940 B2 | 4/2008 | Charters |
| 7,355,780 B2 | 4/2008 | Chui |
| 7,366,393 B2 | 4/2008 | Cassarly |
| 7,374,327 B2 | 5/2008 | Schexnaider |
| 7,375,779 B2 | 5/2008 | Lee et al. |
| 7,380,969 B2 | 6/2008 | Yamashita |
| 7,388,706 B2 | 6/2008 | Miles |
| 7,389,476 B2 | 6/2008 | Senda et al. |
| 7,420,638 B2 | 9/2008 | Tasaka et al. |
| 7,477,809 B1 | 1/2009 | Tan et al. |
| 7,520,642 B2 | 4/2009 | Holman et al. |
| 7,532,800 B2 | 5/2009 | Iimura |
| 7,561,323 B2 | 7/2009 | Gally |
| 7,564,612 B2 | 7/2009 | Chui |
| 7,603,001 B2 | 10/2009 | Wang |
| 7,663,714 B2 | 2/2010 | Haga et al. |
| 7,719,747 B2 | 5/2010 | Tung |
| 7,750,886 B2 | 7/2010 | Sampsell |
| 7,766,498 B2 | 8/2010 | Sampsell |
| 7,855,827 B2 | 12/2010 | Xu et al. |
| 7,876,489 B2 | 1/2011 | Gandhi et al. |
| 7,880,954 B2 | 2/2011 | Sampsell |
| 7,911,428 B2 | 3/2011 | Gally |
| 7,933,475 B2 | 4/2011 | Wang |
| 7,949,213 B2 | 5/2011 | Mienko |
| 2001/0003504 A1 | 6/2001 | Ishihara |
| 2001/0010630 A1 | 8/2001 | Umemoto |
| 2001/0019380 A1 | 9/2001 | Ishihara |
| 2001/0019479 A1 | 9/2001 | Nakabayashi |
| 2001/0022636 A1 | 9/2001 | Yang et al. |
| 2001/0055076 A1 | 12/2001 | Ochi et al. |
| 2002/0006036 A1 | 1/2002 | Egawa |
| 2002/0008969 A1 | 1/2002 | Mabuchi et al. |
| 2002/0034071 A1 | 3/2002 | Mabuchi |
| 2002/0044445 A1 | 4/2002 | Bohler |
| 2002/0060907 A1 | 5/2002 | Saccomanno |
| 2002/0101551 A1 | 8/2002 | Akaoka |
| 2002/0106182 A1 | 8/2002 | Kawashima |
| 2002/0135560 A1 | 9/2002 | Akaoka |
| 2002/0149584 A1 | 10/2002 | Simpson |
| 2002/0167730 A1 | 11/2002 | Needham |
| 2002/0176035 A1 | 11/2002 | Yamazaki |
| 2003/0012009 A1 | 1/2003 | Suzuki |
| 2003/0016930 A1 | 1/2003 | Inditsky |
| 2003/0030764 A1 | 2/2003 | Lee |
| 2003/0090887 A1 | 5/2003 | Igarashi |
| 2003/0095401 A1 | 5/2003 | Hanson |
| 2003/0098957 A1 | 5/2003 | Haldiman |
| 2003/0103344 A1 | 6/2003 | Niida |
| 2003/0123245 A1 | 7/2003 | Parker |
| 2003/0160919 A1 | 8/2003 | Suzuki |
| 2003/0165067 A1 | 9/2003 | Imamura |
| 2003/0169385 A1 | 9/2003 | Okuwaki |
| 2003/0193630 A1 | 10/2003 | Chiou |
| 2003/0210222 A1 | 11/2003 | Ogiwara et al. |
| 2003/0210367 A1 | 11/2003 | Nakano |
| 2003/0214728 A1 | 11/2003 | Olczak |
| 2003/0231483 A1 | 12/2003 | Higashiyama |
| 2004/0001169 A1 | 1/2004 | Saiki |
| 2004/0017599 A1 | 1/2004 | Yang |
| 2004/0027315 A1 | 2/2004 | Senda |
| 2004/0042233 A1 | 3/2004 | Suzuki |
| 2004/0051929 A1 | 3/2004 | Sampsell |
| 2004/0061946 A1 | 4/2004 | Yoshikawa |

| | | |
|---|---|---|
| 2004/0070711 A1 | 4/2004 | Wen |
| 2004/0080938 A1 | 4/2004 | Holman |
| 2004/0085748 A1 | 5/2004 | Sugiura |
| 2004/0100796 A1 | 5/2004 | Ward |
| 2004/0170373 A1 | 9/2004 | Kim |
| 2004/0184134 A1 | 9/2004 | Makigaki |
| 2004/0188599 A1 | 9/2004 | Viktorovitch |
| 2004/0218390 A1 | 11/2004 | Holman |
| 2004/0246743 A1 | 12/2004 | Lee |
| 2005/0002082 A1 | 1/2005 | Miles |
| 2005/0024849 A1 | 2/2005 | Parker |
| 2005/0041175 A1 | 2/2005 | Akiyama |
| 2005/0120553 A1 | 6/2005 | Brown |
| 2005/0195175 A1 | 9/2005 | Anderson |
| 2005/0195370 A1 | 9/2005 | Gore |
| 2005/0206802 A1 | 9/2005 | Creemers |
| 2005/0213346 A1 | 9/2005 | Kao |
| 2005/0231977 A1 | 10/2005 | Hayakawa |
| 2005/0231981 A1 | 10/2005 | Hoelen et al. |
| 2005/0248524 A1 | 11/2005 | Feng |
| 2005/0259939 A1 | 11/2005 | Rinko |
| 2006/0002141 A1 | 1/2006 | Ouderkirk |
| 2006/0024017 A1 | 2/2006 | Page |
| 2006/0044523 A1 | 3/2006 | Teijido |
| 2006/0050032 A1 | 3/2006 | Gunner |
| 2006/0051048 A1 | 3/2006 | Gardiner |
| 2006/0061705 A1 | 3/2006 | Onishi |
| 2006/0062016 A1 | 3/2006 | Dejima |
| 2006/0066586 A1 | 3/2006 | Gally |
| 2006/0066935 A1 | 3/2006 | Cummings |
| 2006/0072315 A1 | 4/2006 | Han |
| 2006/0072339 A1 | 4/2006 | Li |
| 2006/0083028 A1 | 4/2006 | Sun |
| 2006/0109686 A1 | 5/2006 | Sugiura |
| 2006/0114244 A1 | 6/2006 | Saxena |
| 2006/0126142 A1 | 6/2006 | Choi |
| 2006/0132383 A1 | 6/2006 | Gally |
| 2006/0164861 A1 | 7/2006 | Maeda |
| 2006/0209012 A1 | 9/2006 | Hagood |
| 2006/0209385 A1 | 9/2006 | Liu |
| 2006/0265919 A1 | 11/2006 | Huang |
| 2006/0268574 A1 | 11/2006 | Jung |
| 2006/0291769 A1 | 12/2006 | Spoonhower |
| 2007/0036492 A1 | 2/2007 | Lee |
| 2007/0064294 A1 | 3/2007 | Hoshino |
| 2007/0097694 A1 | 5/2007 | Faase |
| 2007/0116424 A1 | 5/2007 | Ting |
| 2007/0133226 A1 | 6/2007 | Mi |
| 2007/0187852 A1 | 8/2007 | Parker et al. |
| 2007/0189036 A1 | 8/2007 | Chen |
| 2007/0201234 A1 | 8/2007 | Ottermann |
| 2007/0241340 A1 | 10/2007 | Pan |
| 2007/0253717 A1 | 11/2007 | Charters |
| 2007/0279727 A1 | 12/2007 | Gandhi |
| 2007/0285406 A1 | 12/2007 | Kukulj |
| 2008/0074402 A1 | 3/2008 | Cornish |
| 2008/0079687 A1 | 4/2008 | Cernasov |
| 2008/0089092 A1 | 4/2008 | Lee |
| 2008/0094853 A1 | 4/2008 | Kim |
| 2008/0170179 A1 | 7/2008 | Shiraishi |
| 2008/0170414 A1 | 7/2008 | Wang |
| 2008/0278460 A1 | 11/2008 | Arnett |
| 2008/0285307 A1 | 11/2008 | Aylward |
| 2008/0285308 A1 | 11/2008 | Clary |
| 2009/0015753 A1 | 1/2009 | Ye |
| 2009/0147332 A1 | 6/2009 | Bita |
| 2009/0168459 A1 | 7/2009 | Holman |
| 2009/0190373 A1 | 7/2009 | Bita |
| 2009/0201301 A1 | 8/2009 | Mienko |
| 2009/0225394 A1 | 9/2009 | Chui |
| 2009/0231877 A1 | 9/2009 | Mienko |
| 2009/0244690 A1 | 10/2009 | Lee |
| 2009/0257108 A1 | 10/2009 | Gruhlke |
| 2009/0296194 A1 | 12/2009 | Gally |
| 2009/0303417 A1 | 12/2009 | Mizushima |
| 2009/0303746 A1 | 12/2009 | Wang |
| 2010/0182308 A1 | 7/2010 | Holman |
| 2010/0195310 A1 | 8/2010 | Baar |
| 2010/0302802 A1 | 12/2010 | Bita |
| 2010/0309103 A1 | 12/2010 | Sampsell |
| 2011/0032214 A1 | 2/2011 | Gruhlke |

FOREIGN PATENT DOCUMENTS

| | | |
|---|---|---|
| CN | 1639596 A | 7/2005 |
| CN | 1755494 A | 4/2006 |
| CN | 1795403 A | 6/2006 |
| DE | 199 42 513 | 3/2001 |
| DE | 10 2007 025092 | 12/2008 |
| EP | 0 590 511 | 4/1994 |
| EP | 0 822 441 | 2/1998 |
| EP | 0 867 747 A2 | 9/1998 |
| EP | 0 879 991 | 11/1998 |
| EP | 0 895 274 | 2/1999 |
| EP | 0 907 050 | 4/1999 |
| EP | 1 089 115 | 4/2001 |
| EP | 1 127 984 | 8/2001 |
| EP | 1 143 270 | 10/2001 |
| EP | 1 231 757 | 8/2002 |
| EP | 1 251 454 | 10/2002 |
| EP | 1 271 223 | 1/2003 |
| EP | 1 296 094 | 3/2003 |
| EP | 1 306 609 | 5/2003 |
| EP | 1 336 876 | 8/2003 |
| EP | 1 341 025 | 9/2003 |
| EP | 1 389 775 | 2/2004 |
| EP | 1 413 543 | 4/2004 |
| EP | 1 445 629 | 8/2004 |
| EP | 1 450 418 | 8/2004 |
| EP | 1 519 218 | 3/2005 |
| EP | 1 531 302 | 5/2005 |
| EP | 1 640 764 | 3/2006 |
| EP | 1 698 918 | 9/2006 |
| EP | 1 734 401 | 12/2006 |
| EP | 1 113 218 B1 | 2/2007 |
| EP | 1 975 651 | 10/2008 |
| EP | 2 251 731 | 11/2010 |
| GB | 2 260 203 | 4/1993 |
| GB | 2 315 356 | 1/1998 |
| GB | 2 336 933 | 11/1999 |
| JP | 57-3266 | 1/1982 |
| JP | 58 115781 | 8/1983 |
| JP | 60 165621 A | 8/1985 |
| JP | 60 242408 | 12/1985 |
| JP | 06-265870 A | 9/1994 |
| JP | 08 050283 A | 2/1996 |
| JP | 09 160032 | 6/1997 |
| JP | 09 311333 | 12/1997 |
| JP | 10 500224 | 1/1998 |
| JP | 10-096910 | 4/1998 |
| JP | 10 325953 | 12/1998 |
| JP | 11-052887 | 2/1999 |
| JP | 11 167808 | 6/1999 |
| JP | 11 211999 | 8/1999 |
| JP | 11 231321 | 8/1999 |
| JP | 11 249132 | 9/1999 |
| JP | 11 316553 | 11/1999 |
| JP | 2000-075287 | 3/2000 |
| JP | 2000 075293 | 3/2000 |
| JP | 2000 181367 | 6/2000 |
| JP | 2000 193933 | 7/2000 |
| JP | 2001-283622 | 10/2001 |
| JP | 2002-014344 | 1/2002 |
| JP | 2002-098838 | 4/2002 |
| JP | 2002 523798 | 7/2002 |
| JP | 2002-229023 | 8/2002 |
| JP | 2002 245835 | 8/2002 |
| JP | 2002-365438 | 12/2002 |
| JP | 2003 007114 | 1/2003 |
| JP | 2003 131215 | 5/2003 |
| JP | 2003-140118 | 5/2003 |
| JP | 2003 173713 | 6/2003 |
| JP | 2003 188959 | 7/2003 |
| JP | 2003 195201 | 7/2003 |
| JP | 2003-315694 | 11/2003 |
| JP | 2004-070189 | 3/2004 |
| JP | 2004-087409 | 3/2004 |
| JP | 2004-126196 | 4/2004 |

| | | |
|---|---|---|
| JP | 2004-145109 | 5/2004 |
| JP | 2004-219843 A | 8/2004 |
| JP | 2005-031219 | 2/2005 |
| JP | 2005-259365 | 9/2005 |
| JP | 2006 099105 | 4/2006 |
| WO | WO 95/01584 | 1/1995 |
| WO | WO 95/30924 | 11/1995 |
| WO | WO 98/19201 | 5/1998 |
| WO | WO 98/52094 | 11/1998 |
| WO | WO 99/63394 | 12/1999 |
| WO | WO 00/11502 | 3/2000 |
| WO | WO 00/50807 | 8/2000 |
| WO | WO 01/29148 | 4/2001 |
| WO | WO 01/84228 | 11/2001 |
| WO | WO 01/84229 | 11/2001 |
| WO | WO 02/35145 A1 | 5/2002 |
| WO | WO 02/071132 | 9/2002 |
| WO | WO 02/097324 | 12/2002 |
| WO | WO 03/007049 | 1/2003 |
| WO | WO 03/056876 | 7/2003 |
| WO | WO 03/105198 | 12/2003 |
| WO | WO 2004/003643 | 1/2004 |
| WO | WO 2004/006003 | 1/2004 |
| WO | WO 2004/012004 | 2/2004 |
| WO | WO 2004/088372 | 10/2004 |
| WO | WO 2005/011012 | 2/2005 |
| WO | WO 2005/076051 | 8/2005 |
| WO | WO 2005/088367 | 9/2005 |
| WO | WO 2006/008702 | 1/2006 |
| WO | WO 2006/036451 | 4/2006 |
| WO | WO 2006/036496 | 4/2006 |
| WO | WO 2007/064133 | 6/2007 |
| WO | WO 2008/045218 | 4/2008 |
| WO | WO 2008/145096 | 12/2008 |
| WO | WO 2010/090877 A1 | 8/2010 |

OTHER PUBLICATIONS

Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Little et al. "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Mehregany et al., "MEMS applications in Optical Systems," IEEE/LEOS 1996 Summer Topical Meetings, pp. 75-76, Aug. 1996.

Miles, M. et al., "Digital Paper™ for reflective displays," Journal of the Society for Information Display, Society for Information Display, San Jose, US, vol. 11, No. 1, pp. 209-215, 2003.

Miles, M.W., "Interferometric Modulation MOEMS as an enabling technology for high-performance reflective displays," Proceedings of the SPIE, vol. 4985, pp. 131-139, Jan. 28, 2003.

Neal T.D. et al. "Surface Plasmon enhanced emission from dye doped polymer layers," Optics Express Opt. Soc. America, USA, vol. 13, No. 14, pp. 5522-5527, Jul. 11, 2005.

Oliner, "Radiating Elements and Mutual Coupling," Microwave Scanning Antennas, vol. 2, pp. 131-157 and pp. 190-194, 1966.

Tai, C.Y. et al. "A Transparent Frontlighting System for Reflective-Type Displays," 1995 SID International Symposium Digest of Technical Papers, vol. 26, pp. 375-378, May 23, 1995.

Zhou et al. "Waveguide Panel Display Using Electromechanical Spatial Modulators" SID Digest, vol. XXIX, 1998.

International Search Report and Written Opinion in PCT/US2010/021678, dated Apr. 21, 2010.

International Preliminary Report on Patentability in PCT/US2010/021678, dated Aug. 18, 2011.

Office Action in U.S. Appl. No. 12/365,755, dated Jun. 20, 2011.

* cited by examiner

|  | Column Output Signals | |
|---|---|---|
|  | +V_bias | -V_bias |
| Row Output Signals  0 | Stable | Stable |
| +ΔV | Relax | Actuate |
| −ΔV | Actuate | Relax |

# SHAPED FRONTLIGHT REFLECTOR FOR USE WITH DISPLAY

BACKGROUND OF THE INVENTION

Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

In one aspect, a display module is provided, including a light-transmissive substrate including a first surface and a second surface, an edgebar in optical communication with a light source, where the edgebar is located over the first surface of the substrate, a frontlight film adjacent the edgebar and in optical communication with the edge bar, where the frontlight film is configured to direct light through the light-transmissive substrate, and a reflector, the reflector including a first substantially planar portion overlying the edgebar and a second substantially planar portion located over the first surface of the substrate and laterally displaced from the edgebar.

In another aspect, an edgebar subassembly configured for use in a display module is provided, the edgebar subassembly including an edgebar configured to receive light through a first surface and reflect light through a second surface orthogonal to the first surface, and a reflector configured to retain the edgebar, the reflector including a first substantially planar portion configured to overlie the edgebar, and a second substantially planar portion configured to be adhered to an underlying layer, where a lower surface of the second substantially planar portion is substantially coplanar with a lower surface of the edgebar, and the edgebar is retained by the reflector.

In another aspect, a method of assembling a display module is provided, the method including providing a substrate having a first and second surface, the substrate including a display array formed over the first surface and a light-guiding layer located over the second surface, where the light-guiding layer is located opposite the display array, positioning an edgebar relative to the substrate such that a first surface of the edgebar is positioned adjacent a side surface of the light-guiding layer, and providing a reflector over the first surface of the substrate such that the reflector retains the edgebar in place, the reflector including a first substantially planar portion overlying the edgebar and a second substantially planar portion displaced from the edgebar and adhered to an underlying layer.

DETAILED DESCRIPTION OF THE PREFERRED EMBODIMENT

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In embodiments in which interferometric modulators are used as display devices, it may be desirable to minimize the footprint of the display module as much as possible. One component which may increase the footprint of the display module is an edgebar utilized in a frontlighting system. By positioning the edgebar and associated reflector entirely on the same side of the display glass or other substrate, the footprint of the display module can be reduced by avoiding the inclusion of additional rigid components which extend beyond the perimeter of the display glass. A substantially Z-shaped reflector having a first planar portion overlying the edgebar and a second planar portion adhered to the substrate or other underlying layer is suitable for use with a display module configured in this manner.

Figure 1:
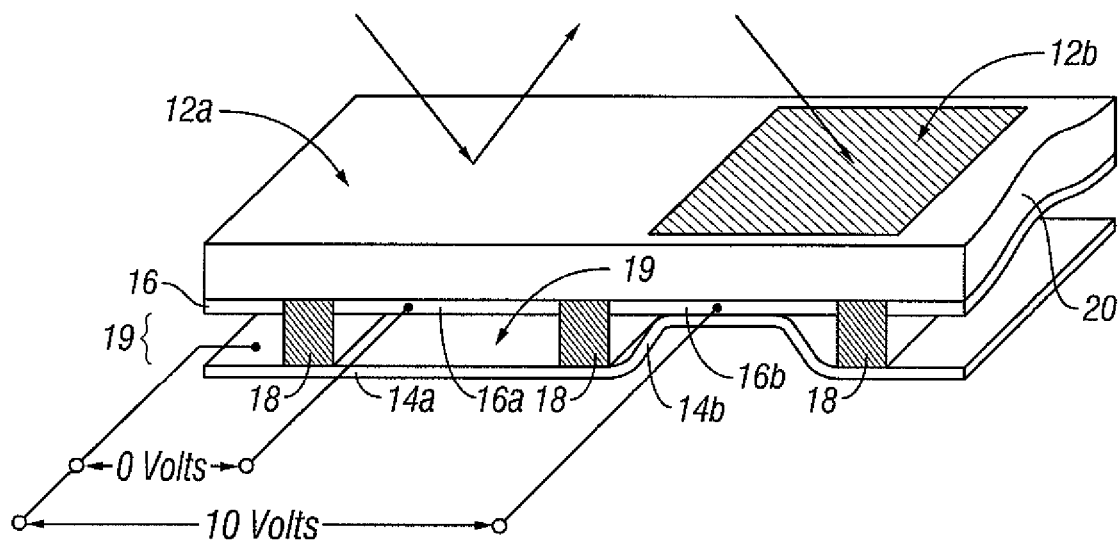
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
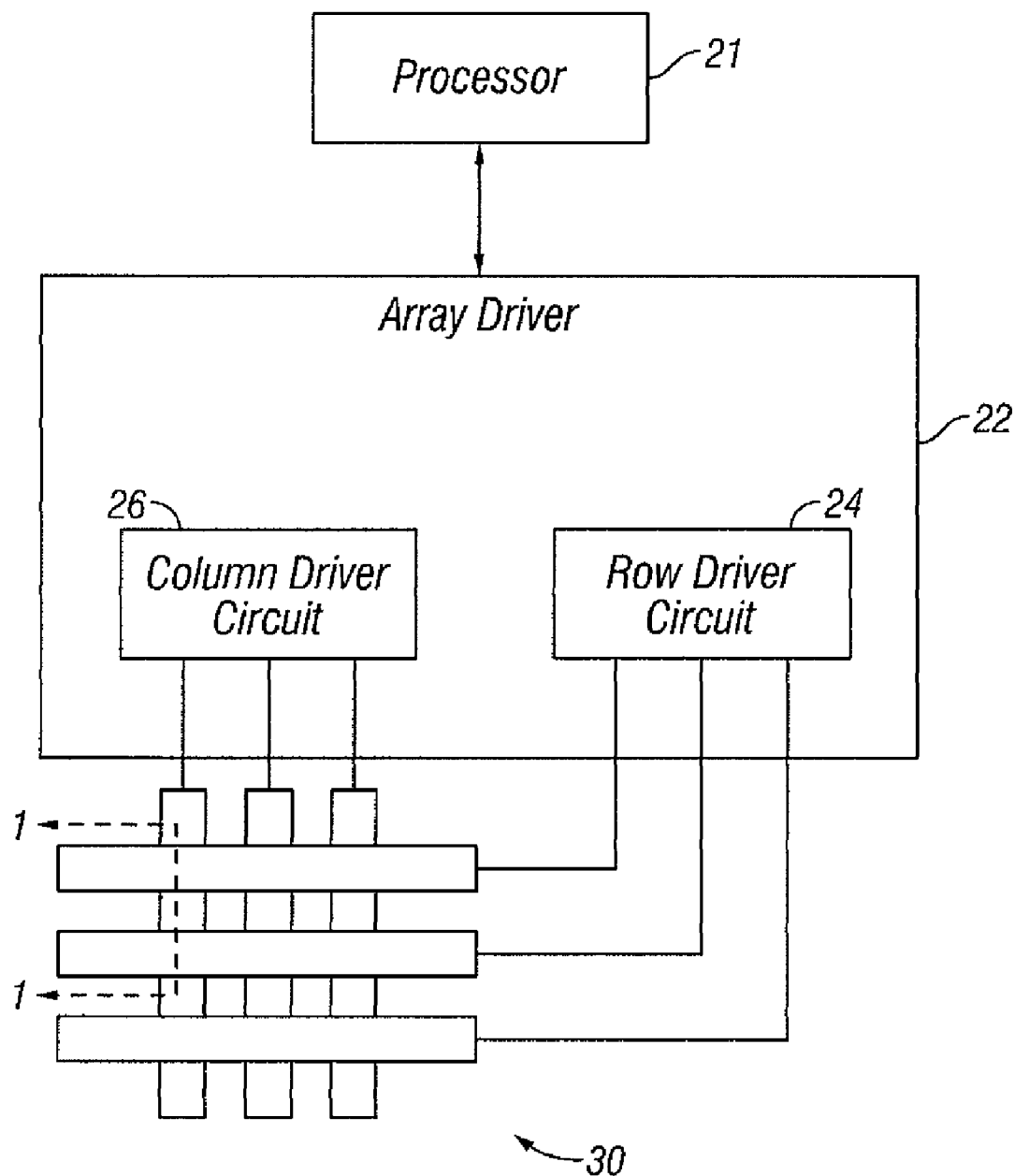
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
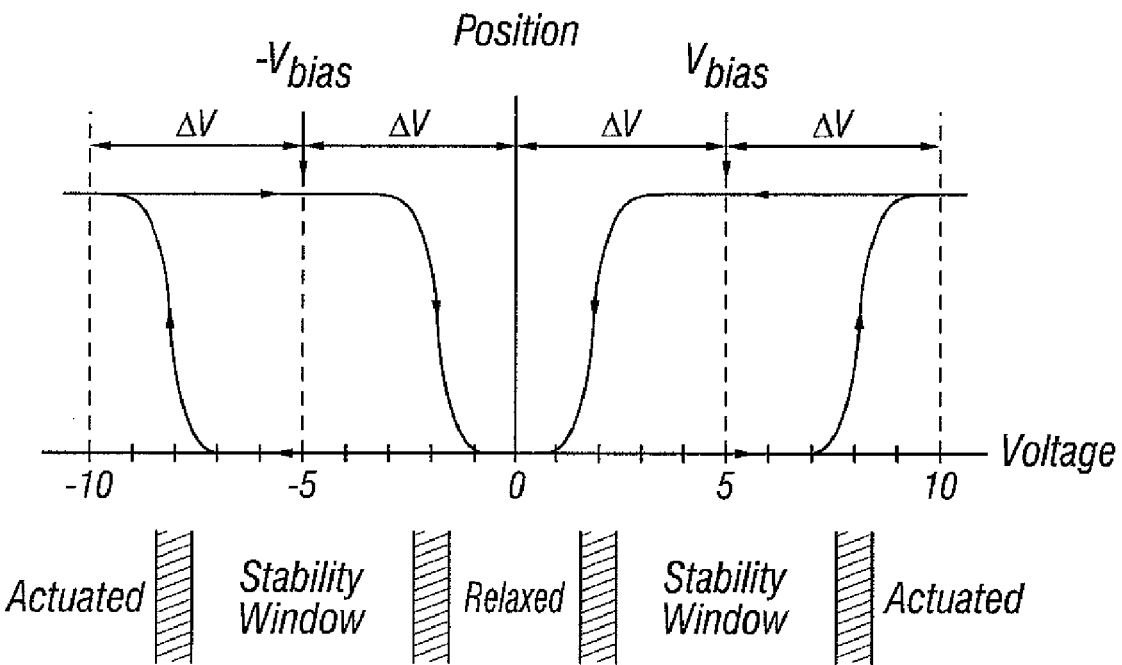
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
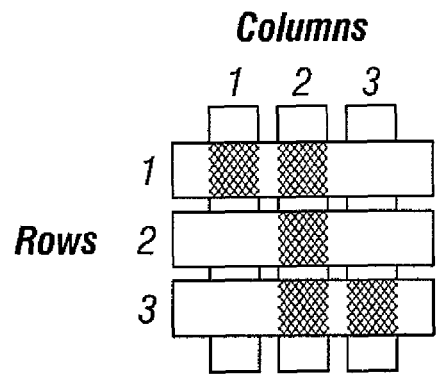
FIGS. 5A and 5B illustrate one exemplary timing diagram for row and column signals that may be used to write a frame of display data to the 3×3 interferometric modulator display of FIG. 2.
Figure 5B:
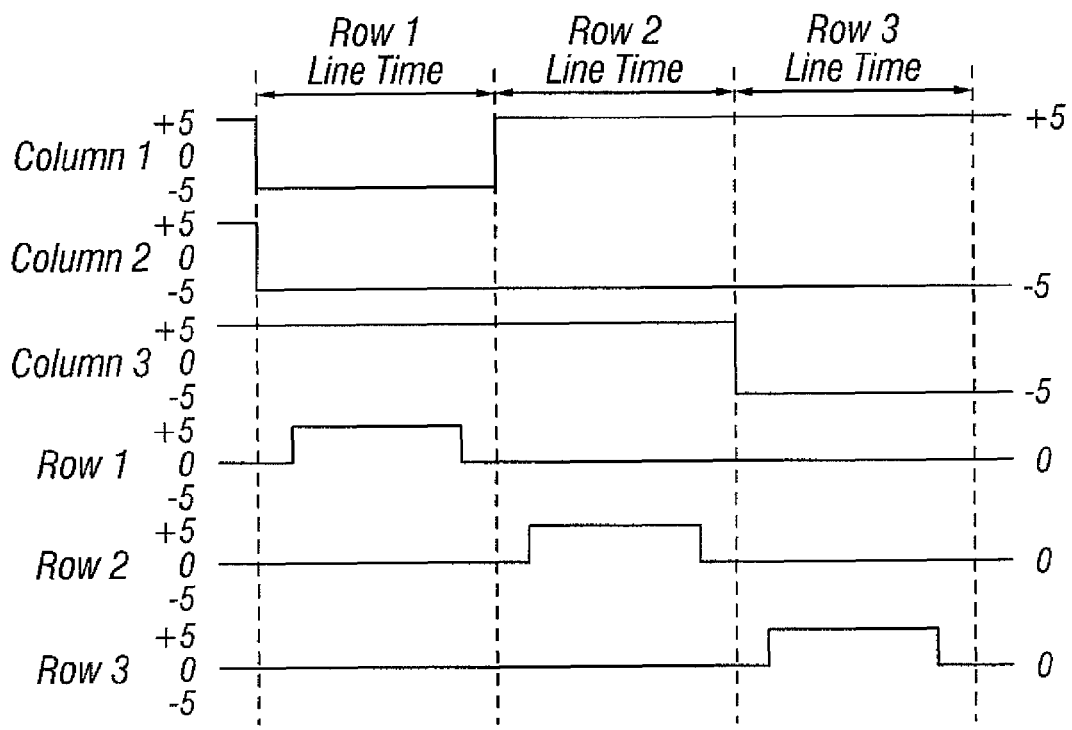

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
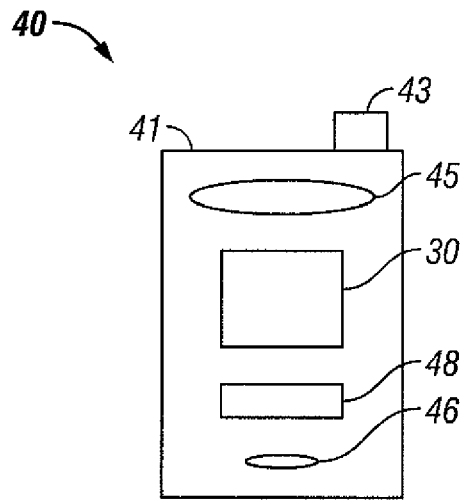
FIGS. 6A and 6B are system block diagrams illustrating an embodiment of a visual display device comprising a plurality of interferometric modulators.
Figure 6B:
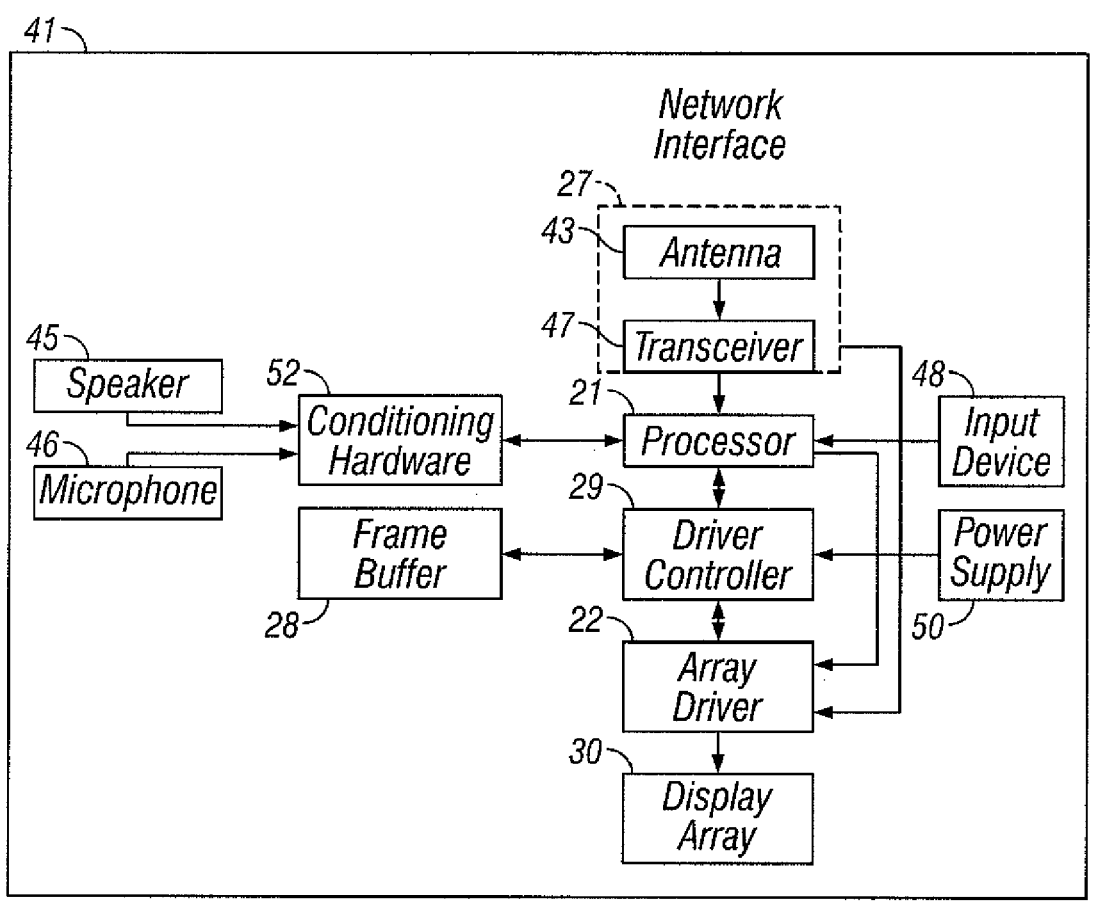

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device,. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
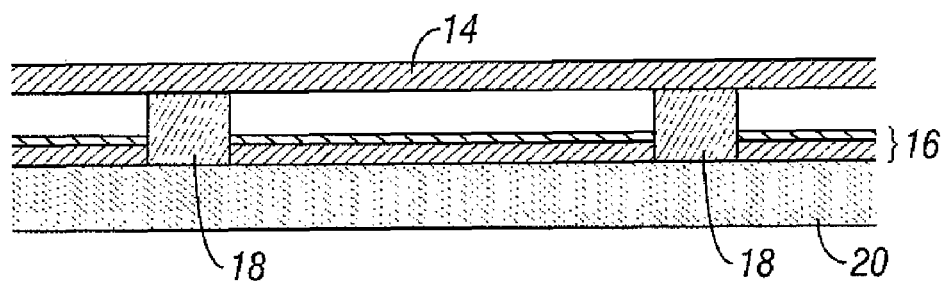
FIG. 7A is a cross section of the device of FIG. 1.
Figure 7B:
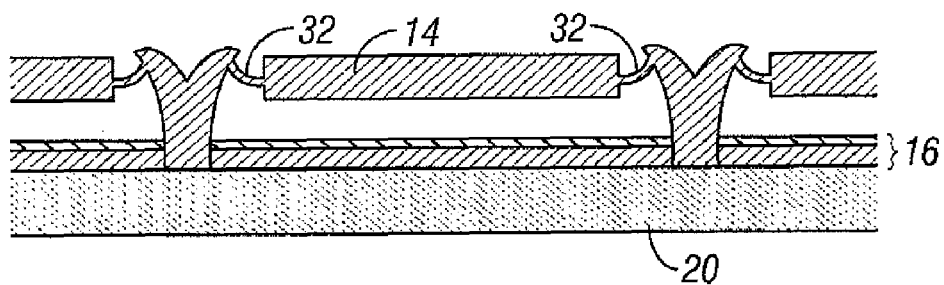
FIG. 7B is a cross section of an alternative embodiment of an interferometric modulator.
Figure 7C:
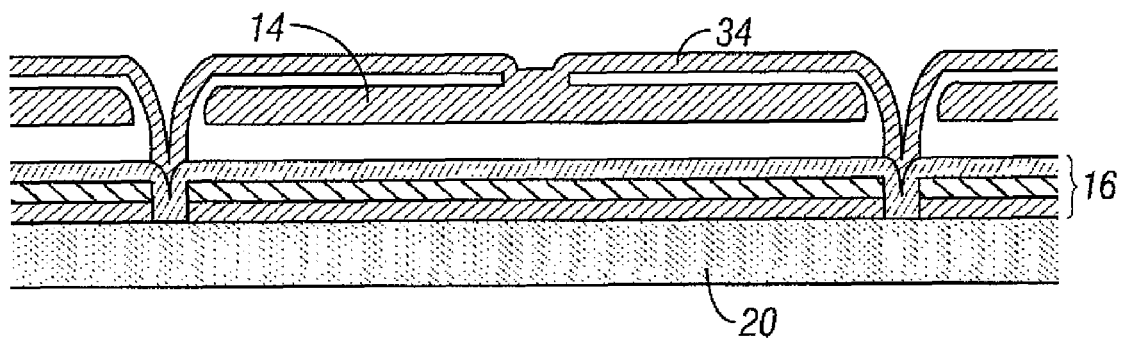
FIG. 7C is a cross section of another alternative embodiment of an interferometric modulator.
Figure 7D:
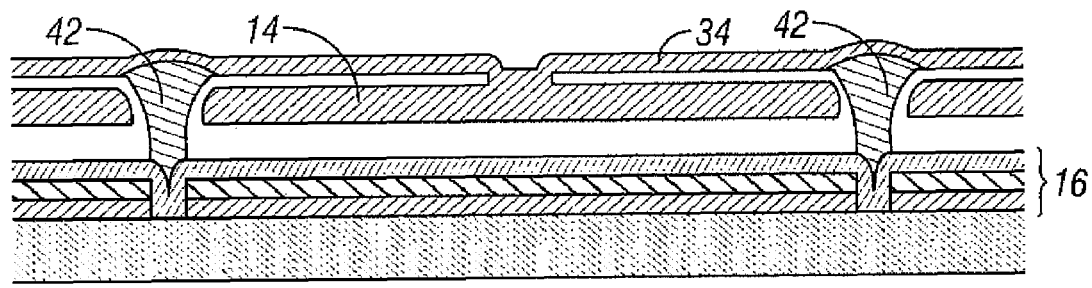
FIG. 7D is a cross section of yet another alternative embodiment of an interferometric modulator.
Figure 7E:
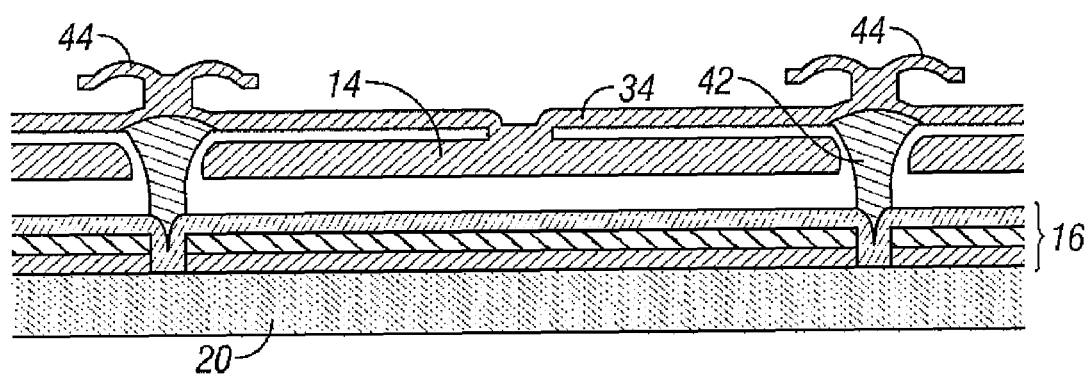
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In certain embodiments, an array of interferometric modulators may be utilized as a display array in a display module. The array of interferometric modulators may be formed on or over a first surface of a light-transmissive or substantially transparent substrate, and the array may be viewable through a second surface of the substrate opposite the first surface.

As the interferometric modulator array may be a reflective display, illumination may be provided by a frontlight system configured to allow light to propagate throughout a light-transmissive guiding layer located between the interferometric modulator array and the viewer, typically by means of total internal reflection (TIR), and reflect the light towards the array at multiple locations throughout the frontlight film to provide substantially even illumination across the surface of the array. Light reflected towards the interferometric modulator array may then be interferometrically modulated and reflected back through the light-guiding layer and towards the viewer.

In certain embodiments, the light-transmissive substrate may serve as the light-guiding layer, and in other embodiments a separate light-guiding layer may be provided. In particular embodiments, as will be discussed in greater detail below, the light-guiding layer may comprise a dedicated frontlight film located on, or over, a surface of the substrate. The light-guiding layer may comprise reflective features either within or adjacent the light-guiding layer to reflect the light towards the interferometric modulator array.

Figure 8A:
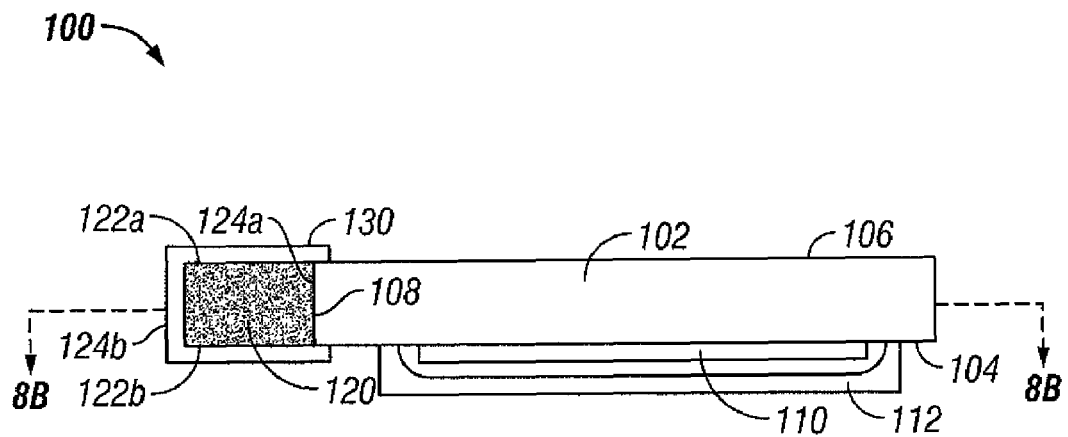
FIG. 8A is a cross-sectional view of an embodiment of a display module in which an edgebar is located adjacent a side surface of the display substrate.
Figure 8B:
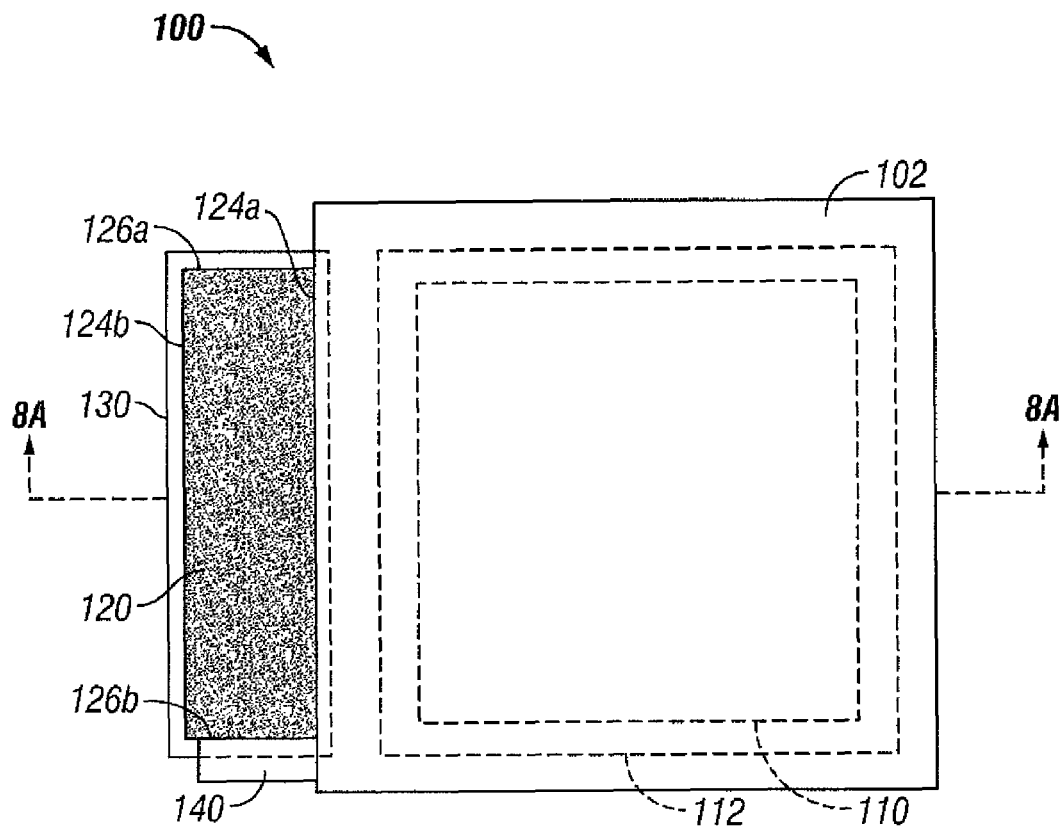
FIG. 8B is a top plan view of a cross-section of the display module of FIG. 8A, taken along the line 8B-8B of FIG. 8A.

FIGS. 8A and 8B illustrate an embodiment of a display module 100 in which the substrate serves as a light-guiding layer. As noted above and described in greater detail below in the specification, a dedicated light-guiding layer may be provided adjacent the substrate in other embodiments. It can be seen in FIG. 8A that a display module 100 comprises a substrate 102 which supports an array of interferometric modulators 110 located on the first surface 104 of the substrate. A backplate 112 sealed to the first surface 104 of the substrate 100 overlies and protects the array of interferometric modulators 110. The array of interferometric modulator 110 is viewable by a viewer through the second surface 106 of the substrate 100.

In certain embodiments, the frontlight system comprises a point light source, such as an LED. It will be understood that, although described as a point source, the light source may comprise one or more LEDs or other light sources adjacent one another. Light emitted from the light source may be directed into an edgebar, wherein the edgebar is configured to convert a point light source into a line light source. In FIG. 8B, it can be seen that the display module 100 includes a light source in the form of LED 140 positioned adjacent a side surface 126b of an edgebar 120.

An edgebar, such as edgebar 120 of FIGS. 8A and 8B, may be positioned proximate the light-guiding layer such that light will be reflected from the edgebar into the light-guiding layer, and propagate throughout the light-guiding layer before being reflected towards the interferometric modulator array. Thus, a light source such as an LED or other point light source may be positioned adjacent an entry surface or region of the edgebar so that light emitted from the light source will enter edgebar. An exit surface or region of the edgebar may be positioned adjacent an entry surface of the light-guiding layer or layers so that light can be directed out of the edgebar and into the light-guiding layer.

In certain embodiments, the edge bar may be positioned to the side of the light-transmissive substrate, and be secured in place via a frame. A front surface adjacent the light-transmissive substrate may thus serve as the exit region of the edge bar, and a surface or portion of a surface orthogonal to the exit surface may serve as the entry region. In a particular embodiment, all or a portion of a side surface (rather than an upper or lower surface) of the edgebar serves as the entry region. A light source in the form of an LED may thus be positioned adjacent the side surface of such an edgebar.

In the embodiment of FIG. 8A, it can be seen that the edgebar 120 of display module 100 is positioned adjacent a side surface 108 of the substrate 102, which serves as the light-guiding layer. Front surface 124a of the edgebar 120 is in optical communication with the substrate 102, such that the front surface 124a serves as an exit region of the edgebar 120. The portion of side edgebar surface 126b adjacent the LED 140 serves as the edgebar entry region.

Because light from the point light source may enter the edgebar at a wide range of angles, an undesirable amount of light loss may occur when light is not totally internally reflected. As can be seen in FIGS. 8A and 8B, a reflector such as reflector 130 may be positioned adjacent one or more surfaces of the edgebar which do not serve as entry or exit regions. In particular embodiments, one or more reflectors may be positioned adjacent all or substantially all of such surfaces, so as to minimize light loss from the edgebar.

A reflector may be provided which covers all or most of the remaining surfaces of the edgebar, and which may extend over at least a portion of the substrate without blocking a portion of the interferometric modulator array. When a side surface of the edgebar serves as the entry region of the edgebar, the reflector may cover at least the upper and lower surfaces of the edgebar, as well as the back surface of the edgebar located opposite the exit surface. Such a reflector may be referred to as a "C-shaped" reflector, although it will be understood that the reflector may also cover the side surface opposite the entry region and light source.

With respect to FIG. 8A, it can be seen that the reflector 130 covers at least a portion of the upper edgebar surface 122a, the back edgebar surface 124b, and the lower edgebar surface 122b, forming a C-shape when seen in cross-section. It can also be seen in FIG. 8B that the reflector 130 covers at least a portion of side edgebar surface 126a as well as a portion of side edgebar surface 126b which does not serve as the edgebar entry portion.

The reflector 130 is illustrated as extending partially onto the substrate 102, but in some embodiments may extend only over the edge bar or may extend over a portion of the substrate 102 larger or smaller than the embodiment of FIG. 8, and the upper and lower portions of the reflector 130 may have different lengths. Driver circuitry (not shown) may also be placed on a surface of the display module, and may in certain embodiments be placed on the same side of the substrate as the interferometric modulator array. As discussed above, a frame (not shown) may in certain embodiments be used to secure the reflector 130 and edgebar 120 in place.

In the illustrated embodiment, light emitted from the LED 140 enters edgebar 120 through side surface 126b, and is reflected by components within edgebar 120 through front surface 124a. Light then propagates through substrate 102, which serves as the light-guiding layer, until it is reflected towards array 110. The reflection of the light towards interferometric modulator array 110 may be done by reflective elements located either within the light guiding layer or on or adjacent the upper surface 104 of the light guiding layer. In certain embodiments, an additional layer (not shown) having such reflective elements may be formed on the upper surface 104 of substrate 102.

It can be seen that the placement of the edgebar 120 along a side surface 106 of the substrate extends the footprint of the display module 100. In embodiments such as display modules for electronic devices, it may be desirable to minimize the footprint of the display by modifying the placement of the edgebar 120 and the shape of the reflector 130.

Figure 9:
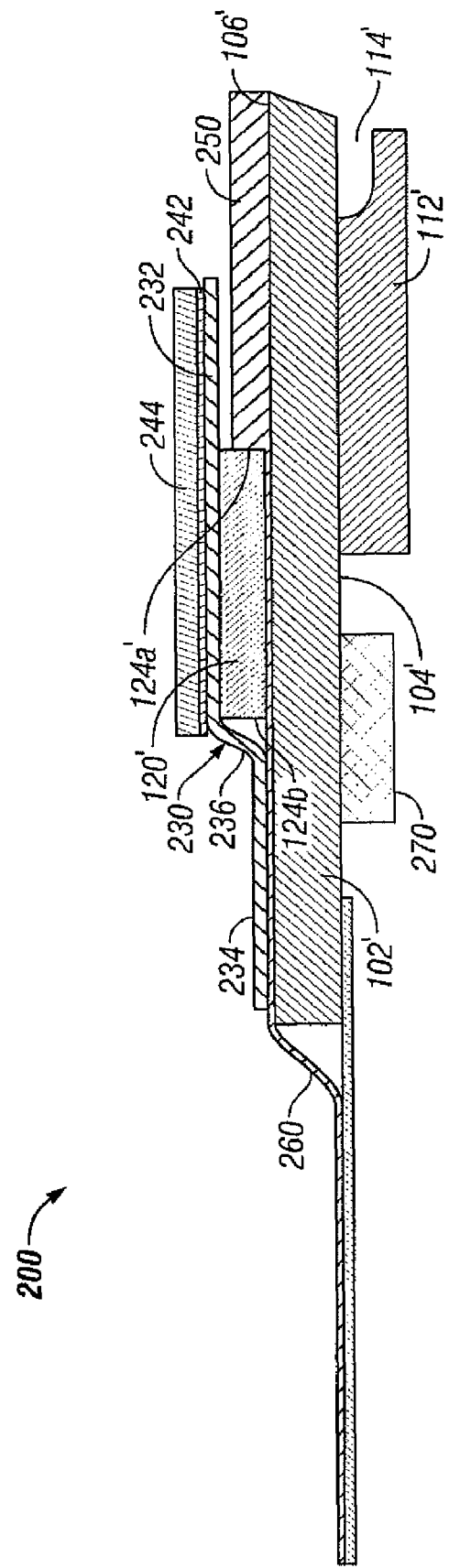
FIG. 9 is a partial cross-section of another embodiment of a display module which includes a Z-shaped reflector overlying an edgebar.

FIG. 9 is a partial cross-section of an alternate embodiment of a display module 200. The display module comprises a substrate 102' having a backplate 112' secured to a first side 104' of the substrate 102' to form a cavity 114' for protecting an array of interferometric modulators (not shown). An edgebar 120' is located over a second side 106 of the substrate 102', and is positioned adjacent a frontlight film 250 which extends over the second surface 106 of the substrate 102' at least over a portion of the interferometric modulator array.

A reflector 230 overlies the edgebar 120' and extends beyond the back edge 124b' towards the edge of the substrate 102'. In contrast to the reflector 130 of FIGS. 8A-8B, the reflector 230 may be located on a single side of the substrate 102. The reflector 230 comprises a first substantially planar portion 232 overlying the edgebar 120, and a second planar portion 234. It can be seen that the second planar portion 204 is laterally displaced from the edgebar 120' such that the second planar portion 204 does not overlie the edgebar 120', but rather extends over a portion of the substrate 102' located between the edgebar 120' and the edge of the substrate. A transition portion 236 which in the illustrated embodiment is curved connects the first planar portion 232 and the second planar portion 234. It can be seen that the first planar portion 232 may extend over at least a portion of the frontlight film 250 so as to reflect additional light towards the frontlight film 250, further minimizing light loss from the edgebar 120'. In certain embodiments, the first planar portion 232 does not extend to a point where a view of the interferometric modulator array would be obscured.

The display module 200 may comprise an LED or other light source (not shown in FIG. 9) located adjacent a side surface of the edgebar 120' in a manner similar to that depicted in FIG. 8B. Electrical connection with the LED may be provided by a flexible printed circuit (FPC) 242 which may be located over the first planar portion 232 of reflector 230, and mechanical support for the LED may be provided by a stiffener member 244 overlying the FPC 242. The LED may thus be suspended beneath the FPC 242 and stiffener 244 such that the LED abuts or is positioned adjacent to a side surface of the edgebar 120'.

It can also be seen that, in the illustrated embodiment, a layer 260 of reflective material such as reflective tape is located between the edgebar 120' and the second surface 106 of the substrate 102'. The reflective tape serves as a reflector to prevent light loss from the bottom of the edgebar 120'. In addition, the reflective tape shields driver integrated circuit 270 from light emitted by the LED or escaping from the edgebar 120', allowing the IC 270 to be mounted directly on or over the first side 104' of substrate 102' adjacent the interferometric modulator array (not shown). This positioning may facilitate the forming of electrical connections between the IC 270 and the interferometric modulator array. In the absence of the underlying reflective tape, light emitted by the LED could interfere with the operation of the IC (e.g., by causing the IC to reset).

Figure 10:
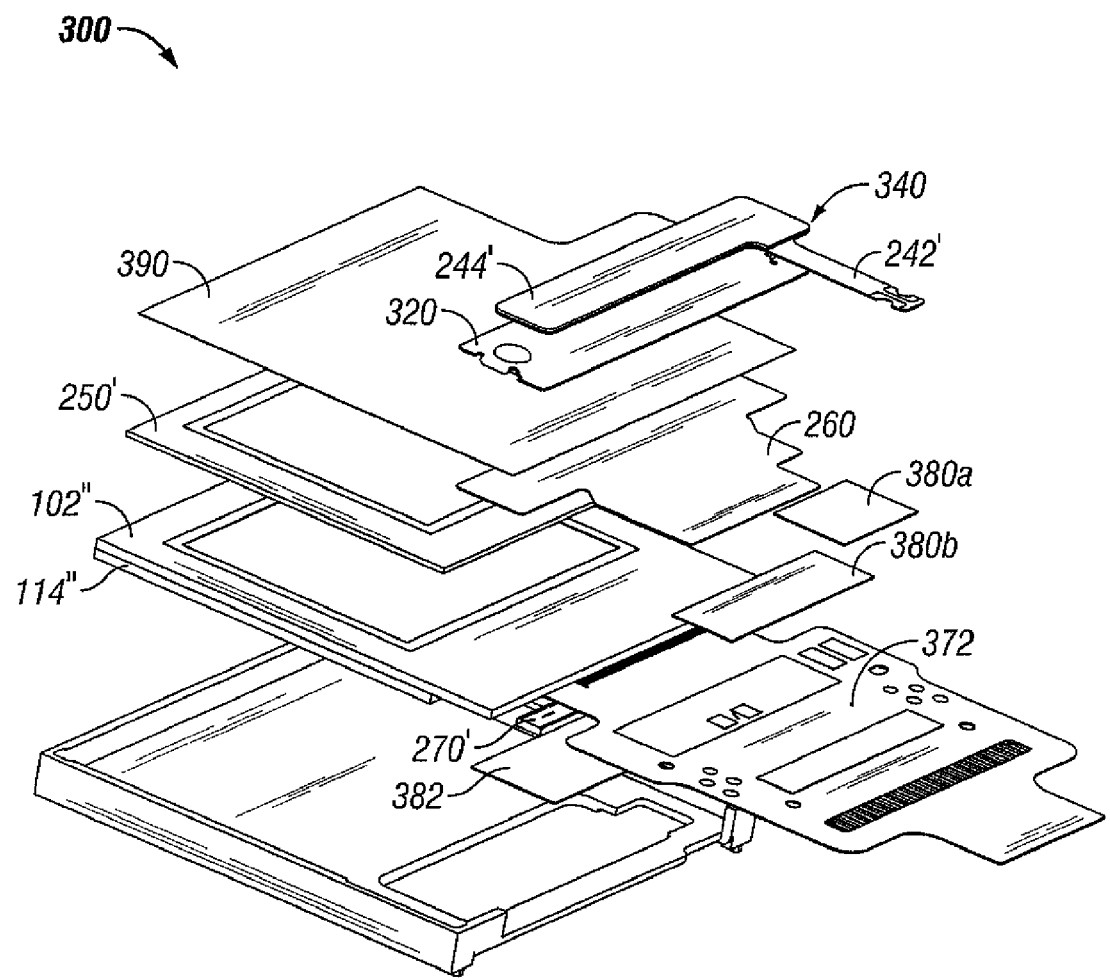
FIG. 10 is a perspective exploded assembly view of a display module which includes a Z-shaped reflector overlying an edgebar.

FIG. 10 is an exploded assembly view of a display module 300 similar to the module 200 of FIG. 9. The display module 300 includes a substrate 102" having an interferometric modulator array and protective backplate 114" adhered to the underside of the substrate 102". An IC 270' may be adhered to the underside of the substrate 102", along with one end of a flex tape 372 which may comprise printed circuitry or other electrical connections for interfacing with external components. Adhesive layers 380a and 380b may be provided to secure certain elements in place during the assembly process. An opaque film 382 may be provided in order to shield the IC 270' from stray light.

Overlying the substrate 102 are frontlight film 250' and reflective tape 260', and a protective film 390 may be formed over the frontlight film 250' and reflective tape 260'. In certain embodiments, the protective film 390 may comprise a layer which can be removed after assembly of the display module. In such an embodiment, the protective film 390 may not underlie any other components of the display module 300 which would inhibit removal of the film.

An edgebar subassembly 320, comprising an edgebar and a reflector overlies the reflective tape 260'. In the illustrated embodiment, the edgebar subassembly 320 comprises an edgebar secured to a reflector via a heat stake. The edgebar subassembly is discussed in greater detail below. An LED subassembly 340 comprising a stiffener 244' and an LED flexible printed circuit 242' may support an underlying LED (not shown). The assembled module may be secured within a protective frame 392.

Figure 11A:
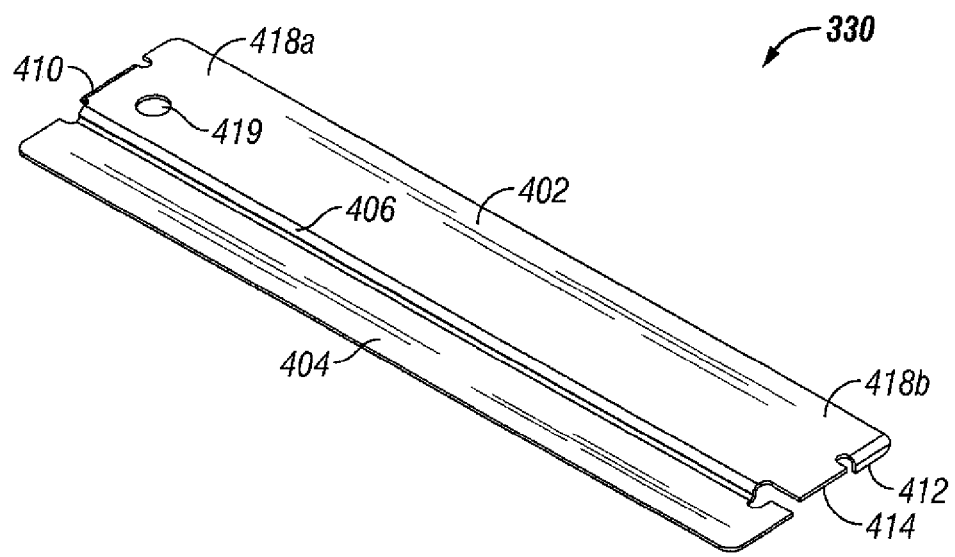
FIG. 11A is a perspective view of the reflector of FIG. 10.
Figure 11B:
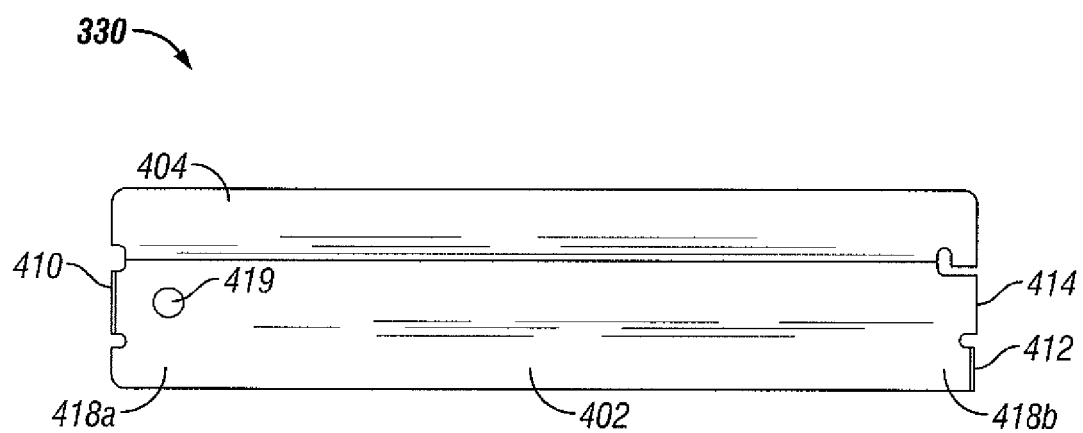
FIG. 11B is a bottom plan view of the reflector of FIG. 11A.
Figure 11C:
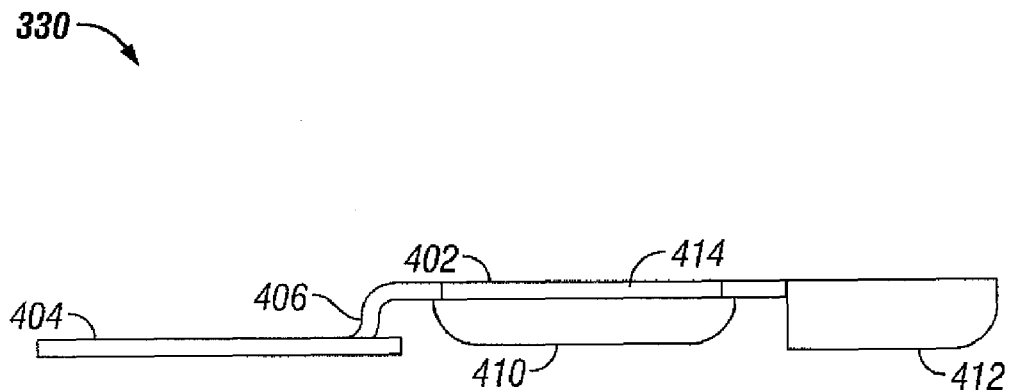
FIG. 11C is a side elevation view of the reflector of FIG. 11A.

FIGS. 11A-11C are various views of a reflector 330 used in the edgebar subassembly 320 of FIG. 10. The reflector 330 comprises a first planar portion 402 configured to overlie an edgebar, and a second planar portion 404 configured to be positioned adjacent the edgebar. The first planar portion 402 is connected to the second planar portion 404 by a transition portion 406 which extends in a direction generally upward from the second planar portion 404 to the first planar portion 402. As can best be seen in FIG. 11C, the transition portion 406 in the illustrated embodiment comprises curved portions where the transition portion 406 meets the first planar portion 402 and the second planar portion 404.

The reflector 330 also comprises tabs extending generally downward from the sides of the first planar portion 402. In particular, it can be seen that a first side 418a of the first planar portion 402 comprises a tab 410 extending downward from the second planar portion from a position adjacent the transition portion 406, whereas the opposite side 418b of the first planar portion 402 comprises a tab 412 spaced apart from the transition region 406. Opposite tab 412 on side 418b is an open area 414 extending between the transition region and the edge of downwardly extending tab 412. This open area 414 allows an LED or other light source to be positioned adjacent an edgebar retained within reflector 330 so as to emit light into the edgebar.

It will be understood that the particular configuration of reflector 330 is an exemplary configuration, and that the configuration of reflector 330 can be varied in a variety of ways. For example, in other embodiments side 418a of the reflector 330 may comprise a longer downwardly extending tab or a pair of downwardly extending tabs, rather than the single downwardly extending tab 410 located adjacent transition region 406 depicted in FIGS. 11A-11C. In other embodiments, no tab 412 may be located on side 418b of the reflector 330.

Figure 12:
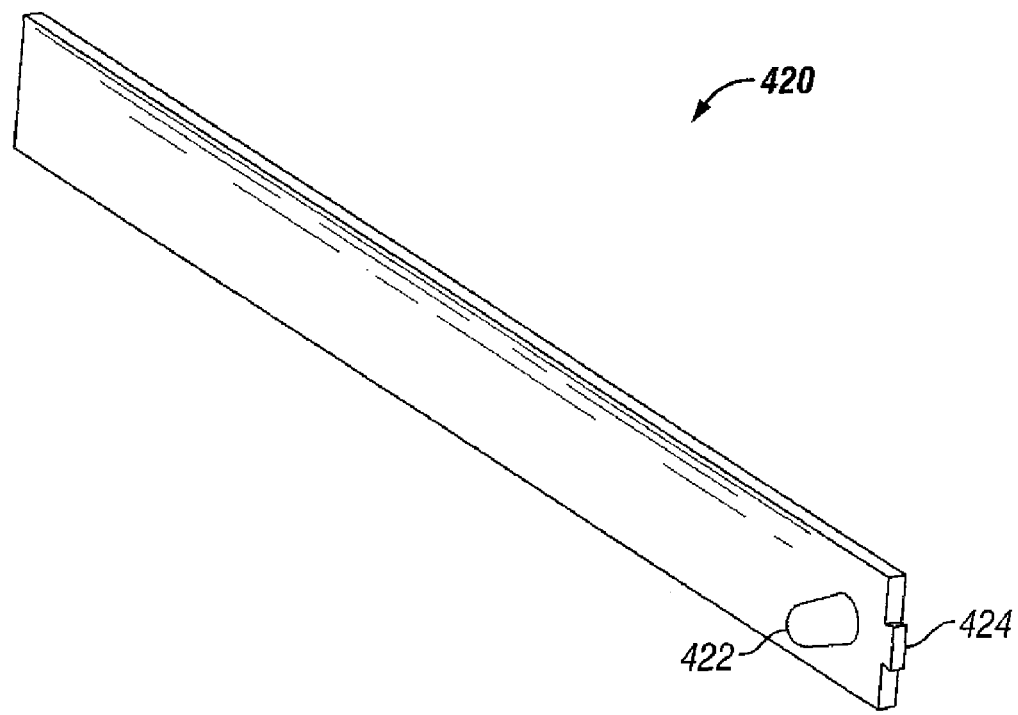
FIG. 12 is a perspective view of an edgebar suitable for use with the reflector of FIG. 11A.

Reflector 330 also comprises an aperture 416 extending through the first planar portion. This aperture 416 can be used to secure an edgebar relative to the reflector 330. FIG. 12 depicts an edgebar 420 suitable for use with reflector 330. As can be seen, the edgebar 420 comprises an upwardly extending portion 422. At least the upwardly extending portion 422 of edgebar 420 comprises a material which is deformable when heated. The edgebar 420 also includes a tab 424 extending from a side portion of the edgebar 420.

Figure 13A:
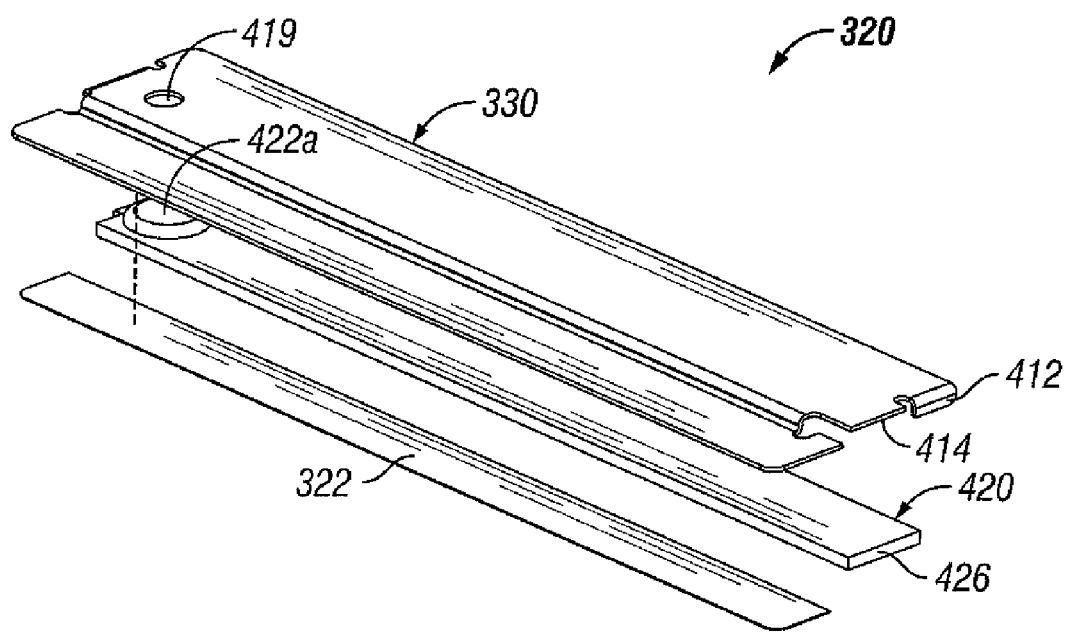
FIG. 13A is a perspective exploded assembly view of an edgebar subassembly comprising the reflector of FIG. 11A.
Figure 13B:
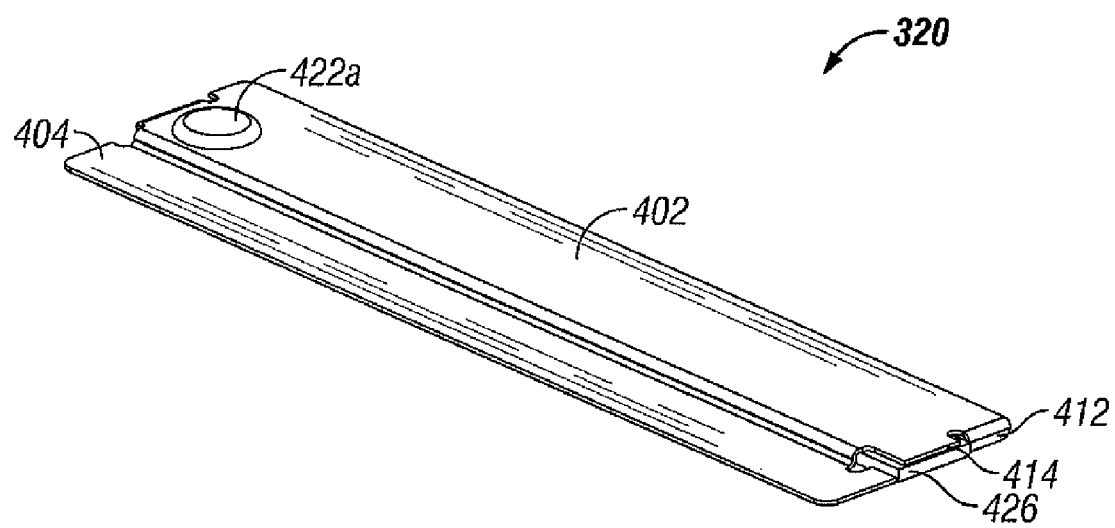
FIG. 13B is a perspective view of the assembled edgebar subassembly of FIG. 13A.
Figure 13C:
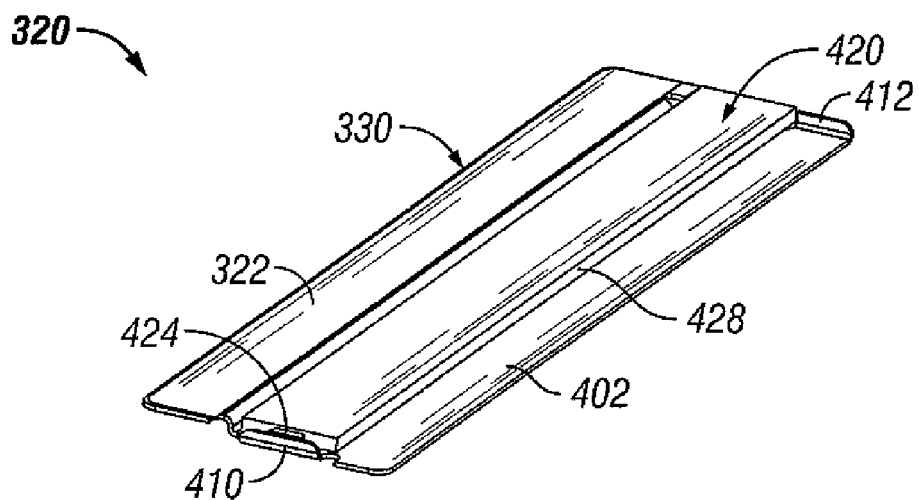
FIG. 13C is a perspective view from below the assembled edgebar subassembly of FIG. 13A.

FIGS. 13A-13C illustrate various views of an edgebar assembly 320 in which an edgebar 420 is secured relative to a reflector 330. In particular, FIG. 13A illustrates in perspective an exploded assembly view of edgebar assembly 320, in which it can be seen that the edgebar assembly 320 comprises a reflector 330 overlying an edgebar 420 and an adhesive layer 322. The first planar portion 402 of reflector 330 overlies the edgebar 330, and the adhesive layer 322 underlies the second planar portion 402. By adhering the second planar portion 404 to an underlying layer, the reflector 330 can be fixedly coupled to the underlying layers, constraining the first planar portion 402 and the edgebar 420 secured beneath the first planar portion 402 without the need to directly adhere the edgebar 420 to any underlying layers.

It can also be seen that the upwardly extending portion of edgebar 420 has been deformed after heating such that it flattens and extends outward. Although depicted in an exploded view, this deformation may occur after the upwardly extending portion 422 (see FIG. 12) is inserted through aperture 419 in the first planar portion 402 of reflector 330 (see FIG. 11A). The upwardly extending portion may then deform outward to a size greater than that of the aperture 419, forming heat stake 422a and securing the edgebar 420 relative to the reflector 330.

In FIG. 13B it can be seen that the space 414 along side 418b of reflector 330 is dimensioned to permit side surface 426 of edgebar 420 to extend into space 414 such that side surface 426 is exposed. As discussed above, an LED or other light source may be positioned adjacent the side surface 426 to permit light from the LED to enter edgebar 426.

In FIG. 13C it can be seen that the tab 424 extending from the other side surface of edgebar 420 may be configured to interact with downwardly extending tab 410 of reflector 330 to hold the edgebar in place. It can also be seen that the edgebar 420 comprises a front surface 428 which will face the frontlight film (not shown) through which light will exit after being directed towards the front surface 428.

In certain embodiments, a reflector such as reflector 330 may comprise a reflective material, such as stainless steel, although a wide variety of other reflective materials or materials coated with a reflective coating may be used. In an embodiment in which the reflector comprises stainless steel, the reflectivity of the reflector may be maintained or increased through an electropolishing process. In certain embodiments, the reflector may be shaped by a stamping process, although a variety of other manufacturing processes may be used.

In certain embodiments, the edgebar need not abut a facing surface of the reflector along the length of a particular side. Rather, the edgebar may abut the reflector at least at a few points sufficient to hold the edgebar in place, but may be spaced apart from the reflector at other points. By spacing the edgebar at least slightly apart from the interior surfaces of the reflector at certain points, total internal reflection of light incident upon those portions of the edgebar may be maintained, reducing light loss which could occur if the light were to be partially absorbed by the reflector.

Figure 14A:
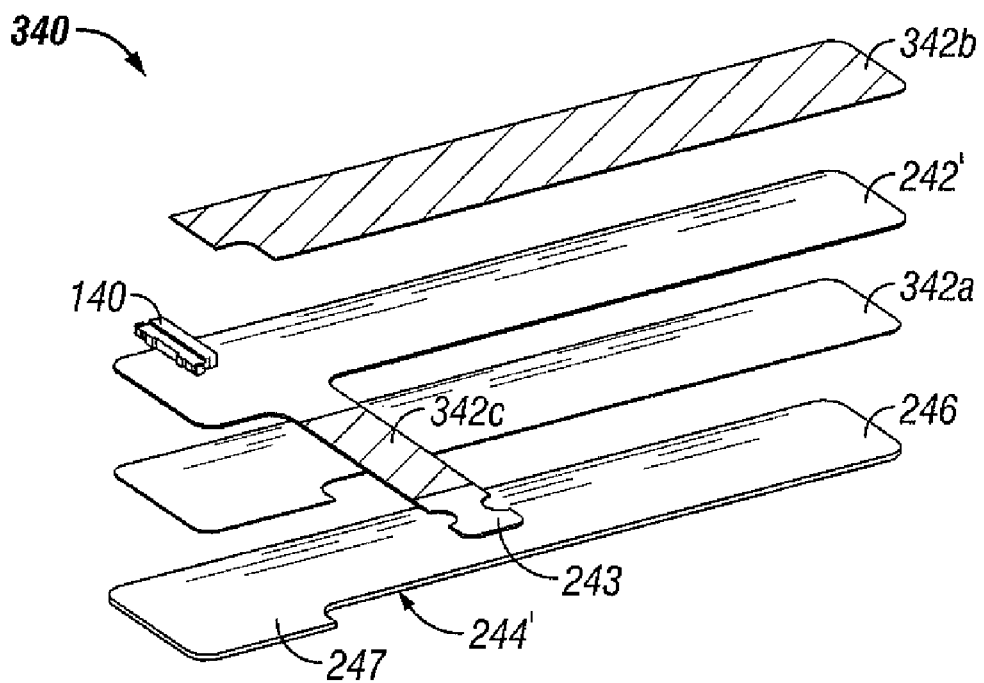
FIG. 14A is a perspective exploded assembly view from beneath the LED subassembly of FIG. 10.
Figure 14B:
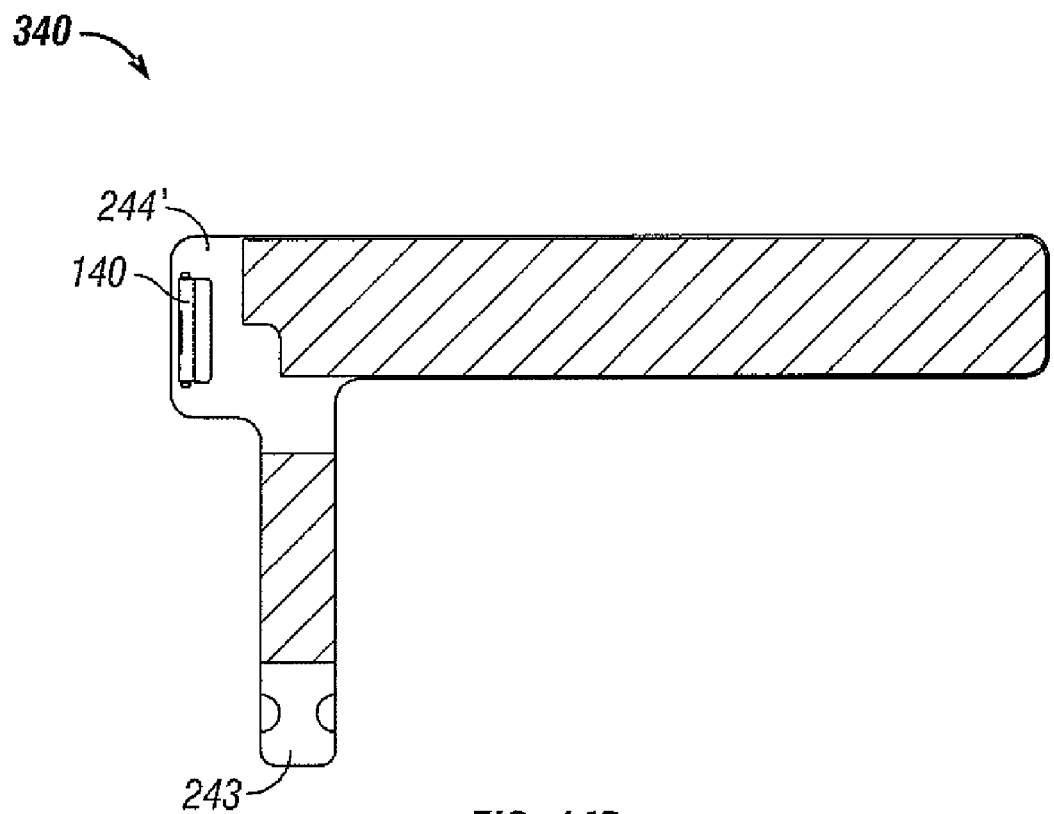
FIG. 14B is a bottom plan view of the LED subassembly of FIG. 14A.
Figure 14C:
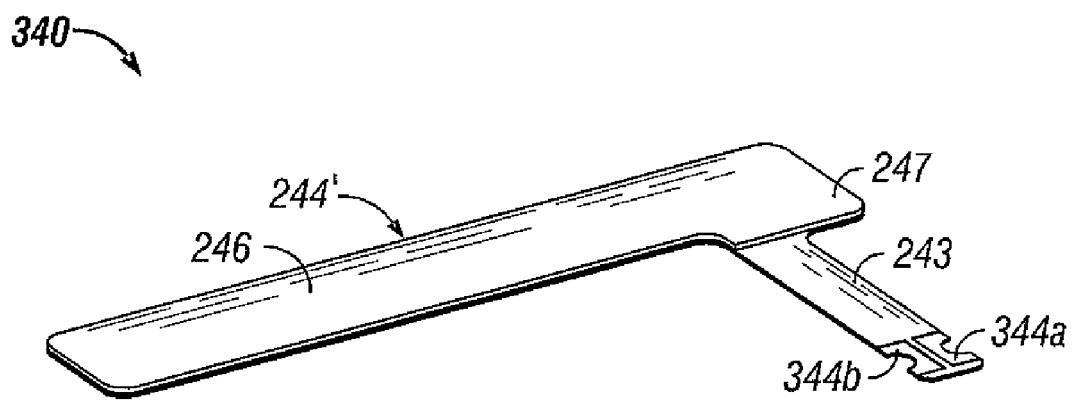
FIG. 14C is a perspective view from above the LED subassembly of FIG. 14A.

FIGS. 14A-14C depict the LED FPC subassembly 340 of FIG. 10. In particular, FIG. 14A illustrates in perspective an exploded assembly view of the LED subassembly 340. The LED subassembly 340 comprises a stiffener 244', an LED flexible printed circuit 242', and an LED 140'. The LED subassembly 340 also includes an adhesive layer 342a configured to adhere the stiffener 244' to the LED FPC 242', and an adhesive layer 342b configured to adhere the LED subassembly 340 to an underlying structure such as an edgebar subassembly. An adhesive region 342c may also be provided to secure an outwardly extending portion 243 of LED FPC 242' in place. As can be seen in FIG. 14C, the outwardly extending portion 243 may comprise connectors in the form of anode 344a and cathode 344b for forming an electrical connection with LED 140'.

In the illustrated embodiment, the stiffener 244' comprises a longitudinally extending portion 246 extending substantially parallel to the edgebar (not shown) when the LED FPC subassembly is adhered or otherwise secured to an underlying reflector subassembly. The stiffener 244 also includes a laterally extending portion 247 on the side of the stiffener 244' where the LED 140' will be attached. In the illustrated embodiment, the longitudinally extending portion 246 is substantially longer than the laterally extending portion 247, but it will be understood that in other embodiments, the length of either of portions 246 and 247 may be altered, and that in other embodiments, the stiffener 244' may take a different shape, such as a substantially rectangular shape.

Because the stiffener 244' may be selected only on the basis of its mechanical properties, such as stiffness, a wide variety of materials may be used, including materials which are not reflective or not highly reflected. In one embodiment, the stiffener 244' may comprise stainless steel, but other suitable materials may be used. It will also be understood that depending on the material and thickness of the stiffener 244', the size and shape of the stiffener may be altered.

It will be understood that various combinations of the above embodiments are possible. It is also to be recognized that, depending on the embodiment, the acts or events of any methods described herein can be performed in other sequences, may be added, merged, or left out altogether (e.g., not all acts or events are necessary for the practice of the methods), unless the text specifically and clearly states otherwise.

For example, in certain embodiments, a reflector may comprise a first planar portion overlying an edgebar and a second planar portion displaced from the edgebar in a direction parallel to the edgebar, such that the second planar portion is located opposite a point source, and the second planar portion and the light source are located on opposite sides of the edgebar. In other embodiments, the substrate may be optically opaque, such that the IMODs are formed on the surface 106' in FIG. 9 and the backplate 112' is of optically transparent material, so that the IMODs are viewed through the backplate 112' (ie, it may be better to refer to the plate 112' as a frontplate in such embodiments). The frontplate 112' is attached to the surface 106' and is interposed between the frontlight and the substrate. Other alterations to the above description are possible.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display module, comprising:
   a light-transmissive substrate comprising a first surface and a second surface;
   an edgebar in optical communication with a light source, wherein the edgebar is located over the first surface of the substrate;
   a frontlight film adjacent the edgebar and in optical communication with the edgebar, wherein the frontlight film is located over the first surface of the light-transmissive substrate, and wherein the frontlight film is configured to direct light through the first surface of the light-transmissive substrate; and
   a reflector, the reflector comprising a first substantially planar portion overlying the edgebar and a second substantially planar portion located over the first surface of the substrate and laterally displaced from the edgebar.

2. The display module of claim 1, wherein the edgebar comprises a front surface facing a side surface of the frontlight film and a second surface oriented substantially orthogonally to the front surface.

3. The display module of claim 2, wherein the first planar portion of the reflector extends beyond the front surface of the edgebar.

4. The display module of claim 3, wherein the first planar portion of the reflector is oriented substantially orthogonally to the front surface of the edgebar.

5. The display module of claim 2, further comprising a light source located adjacent the second surface of the edgebar and configured to emit light into the edgebar.

6. The display module of claim 5, wherein the light source comprises at least one LED.

7. The display module of claim 6, wherein said at least one LED is supported by a stiffener which extends over at least a portion of the first planar portion of the reflector.

8. The display module of claim 1, wherein the reflector comprises at least one aperture extending therethrough, and wherein the edgebar comprises a connector portion which extends through said aperture.

9. The display module of claim 8, wherein the connector portion comprises a distal section located on the opposite side of the reflector from the remainder of the edgebar, and wherein at least a portion of the distal section has a cross-sectional size which is larger than the cross-sectional size of the aperture.

10. The display module of claim 8, wherein the connector portion comprises a heat stake.

11. The display module of claim 1, further comprising a layer of reflective material located between the edgebar and the substrate.

12. The display module of claim 11, further comprising a driver IC located over the second surface of the substrate, wherein the layer of reflective material is disposed between the edgebar and the driver IC.

13. The display module of claim 1, further comprising a display array disposed over the second surface of the substrate, wherein the display array is positioned opposite the frontlight film.

14. The display module of claim 13, wherein the display array comprises an array of interferometric modulators.

15. The display module of claim 13, further comprising:
   a processor that is configured to communicate with said display array, said processor being configured to process image data; and
   a memory device that is configured to communicate with said processor.

16. The display module of claim 15, further comprising a driver circuit configured to send at least one signal to said display array.

17. The display module of claim 16, further comprising a controller configured to send at least a portion of said image data to said driver circuit.

18. The display module of claim 15, further comprising an image source module configured to send said image data to said processor.

19. The display module of claim 18, wherein said image source module comprises at least one of a receiver, transceiver, and transmitter.

20. The display module of claim 15, further comprising an input device configured to receive input data and to communicate said input data to said processor.

21. An edgebar subassembly configured for use in a display module, the edgebar subassembly comprising:
   an edgebar configured to receive light through a first surface and reflect light through a second surface orthogonal to said first surface; and
   a reflector configured to retain the edgebar, the reflector comprising:
      a first substantially planar portion configured to overlie the edgebar; and
      a second substantially planar portion configured to be adhered to an underlying layer, wherein the first substantially planar portion extends generally parallel to the second substantially planar portion;
   wherein a lower surface of the second substantially planar portion is substantially coplanar with a lower surface of the edgebar, and the edgebar is retained by the reflector.

22. The edgebar subassembly of claim 21, wherein the second planar portion of the reflector is laterally displaced with respect to the edgebar.

23. The edgebar subassembly of claim 21, wherein the lower surface of the edgebar is substantially orthogonal to each of the first and second surfaces of the edgebar.

24. The edgebar subassembly of claim 21, wherein the reflector comprises an aperture extending through the reflector, additionally comprising a heat stake extending from the edgebar through said aperture to retain the edgebar relative to the reflector.

* * * * *